United States Patent
Le et al.

(10) Patent No.: US 11,921,885 B2
(45) Date of Patent: Mar. 5, 2024

(54) SECURITY RISK-AWARE SCHEDULING ON CONTAINER-BASED CLOUDS

(71) Applicant: International Business Machines Corporation, Armonk, NY (US)

(72) Inventors: Michael Vu Le, Danbury, CT (US); Md Salman Ahmed, Blacksburg, VA (US); Hani Talal Jamjoom, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 17/340,145

(22) Filed: Jun. 7, 2021

(65) Prior Publication Data

US 2022/0391532 A1    Dec. 8, 2022

(51) Int. Cl.
| | |
|---|---|
| *G06F 21/00* | (2013.01) |
| *G06F 9/455* | (2018.01) |
| *G06F 9/48* | (2006.01) |
| *G06F 21/57* | (2013.01) |
| *G06F 21/62* | (2013.01) |

(52) U.S. Cl.
CPC ...... *G06F 21/6245* (2013.01); *G06F 9/45558* (2013.01); *G06F 9/4881* (2013.01); *G06F 21/577* (2013.01); *G06F 2009/45595* (2013.01)

(58) Field of Classification Search
CPC ............. G06F 21/6245; G06F 9/45558; G06F 9/4881; G06F 21/577; G06F 2009/45595; G06F 2009/45587; G06F 9/45533
See application file for complete search history.

(56) References Cited

U.S. PATENT DOCUMENTS

| | | | |
|---|---|---|---|
| 9,965,309 B2 | 5/2018 | Fine et al. | |
| 9,973,538 B2 | 5/2018 | Duan | |
| 2019/0116199 A1* | 4/2019 | Stopel | G06F 9/545 |

(Continued)

FOREIGN PATENT DOCUMENTS

WO    2019228717 A1    12/2019

OTHER PUBLICATIONS

Bahrami, et al., "Compliance-Aware Provisioning of Containers on Clouds," 2017 IEEE 10th International Conference on Cloud Computing (CLOUD), Jun. 2017.

(Continued)

*Primary Examiner* — Yogesh Paliwal
(74) *Attorney, Agent, or Firm* — Stosch Sabo

(57) ABSTRACT

A method, apparatus and computer program product for scheduling placement of containers in association with a set of hosts. The technique utilizes metrics that characterize container-specific risks. A first metric is a host interface risk for a container that quantifies how similar or dissimilar the container is relative to other containers running on a host. Preferably, host interface risk is derived with respect to a system call interface comprising a set of system calls, and the metric is based at least in part on a measure of dissimilarity among system calls. A second metric is a data sensitivity score that quantifies a degree to which sensitive data accesses are associated to the container. Based at least in part on the host interface risk scores and the data sensitivity scores, one or more containers are automatically scheduled for placement on the set of hosts to minimize security risk for the set of hosts.

18 Claims, 8 Drawing Sheets

(56) References Cited

U.S. PATENT DOCUMENTS

2021/0266340 A1* 8/2021 Grounds .................. G06N 7/01
2021/0306367 A1 9/2021 Le
2022/0337618 A1* 10/2022 Shemer ................. G06F 9/5055

OTHER PUBLICATIONS

Afoulki, et al., "A Security-Aware Scheduler for Virtual Machines on IaaS Clouds," Universite D'Orleans, 2011.
Li, et al., "Improving Cloud Survivability Through Dependency Based Virtual Machine Placement," SECRYPT2012—International Conference on Security and Cryptography, 2012.
Yu et al, "A Security-Awareness Virtual Machine Placement Scheme in the Cloud," The Scientific World Journal, vol. 2014, Feb. 2014.
Han, et al., "Reducing Security Risks of Clouds Through Virtual Machine Placement," IFIP Annual Conference on Data and Applications Security and Privacy, Jun. 2017.
"Integrating security into your DevOps pipeline," tenable.io, Data Sheet, 2021.
Al-Haj et al., "Security-Aware Resource Allocations in Clouds," 2013 IEEE 10th International Conference on Services Computing, 2013, pp. 400-407.
Caron et al., "Definition of security metrics for the Cloud Computing and security-aware virtual machine placement alogrithms," 2013 International Conference on Cyber-Enabled Distributed Computing and Knowledge Discovery, IEEE Xplore, 2013, pp. 125-131.
Shetty S. et al., "Moving Target Defense for Distributed Systems, Chapter 2—Security-Aware Virtual Machine Placement in Cloud Data Center" Wireless Networks, 2016, pp. 13-24, Springer International Publishing, Switzerland.
Yuchi, X. et al., "Enabling Security-Aware Virtual Machine Placement in IaaS Clouds," IEEE Xplore, 2015, pp. 1554-1559.

* cited by examiner

```
Algorithm :      Isolating a risky container
 1 input : c, a container
 2 input : hosts, a set of hosts
 3 input : POPU L, a weight vector for syscall popularity
 4 input : CV SS, a weight vector for syscall cvss
 5 input : LOC, a weight vector for syscall level of control on a host
 6 output : best host for the incoming container
 7 data_sensitivity_vector ← get_all_containers_data_sensitivity()
 8 candidates ← {}
 9 foreach host h : host s do
10 |   ds ← get_dissim_syscalls(c, h.get_containers())
11 |   foreach syscall s : ds do
12 |   |   popul_score += 1 - POPUL[s]
13 |   |   cvss_score += CVSS[s]
14 |   |   loc_score += LOC[s]
15 |   risk_score ← popul_score + cvss_score + loc_score
16 |   data_sensitivity ← get_min_data_sensitivity(h.get_containers())
17 |   sched_score ← | risk_score-data_sensitivity |
18 |   candidates.add([h, sched_score])
19 sort(candidates, key=[sched_score])
20 cand ← pick_candidate_with_best_sched_score(c, candidates)
21 check_and_apply_strict_enforcement(cand, hosts, data_sensitivity_vector)
```

FIG. 8

SECURITY RISK-AWARE SCHEDULING ON CONTAINER-BASED CLOUDS

BACKGROUND OF THE INVENTION

Technical Field

This disclosure relates generally to data processing systems in a data center operating environment.

Background of the Related Art

Cloud operators have provided a variety of different compute abstractions to customers, such as bare-metal servers, VMs, and more recently, containers. In Linux, containers are processes or groups of processes that experience a private view of system resources via kernel mechanisms including namespaces and cgroups, despite potentially sharing the kernel with other containers. Moreover, container-based cloud platforms are increasingly offering models in which containers from different—potentially mutually-distrusting—tenants share a cluster. In these cases, the cloud provider has the opportunity and/or responsibility of exerting scheduling decisions.

As the container cloud ecosystem rapidly expands, the security of containers remains a concern. Part of the concern originates from the inherent interaction model between containers and the underlying system. Because containers are composed of processes, they can interact directly with the highly privileged host kernel through the system call interface. The system call interface is wide: to date, Linux includes over 340 system calls. Any system call that contains a vulnerability could potentially be used to escalate privileges or otherwise compromise the system. Thus, the security of a container is intimately linked with the security of neighboring containers on a host and what system calls those containers can access and potentially exploit. Further exacerbating the problem, cloud providers strive to increase container density to improve host utilization by multiplexing workloads from different users and tenants on the same set of physical hosts, providing ample opportunities for distrusting containers to become neighbors.

One approach to improving the security of the host is to limit the system call interface, and thus the attack surface of the host. Mechanisms that perform per-process system call filtering can restrict access to the kernel for a specific process, but this approach provides no guarantee what system calls are accessible by neighboring containers. Host or system-wide specialization approaches can restrict access to system calls for all containers, but they are often too conservative from fear of over-restricting the interface and thereby causing some containers to incorrectly execute. While these approaches can be effective in reducing the attack surface on individual hosts, they do not look at the cloud- or cluster-wide reduction in attack surface.

Current container schedulers used in the industry make placement decisions based on resource availability, high availability, and user-specified collocation constraints, but they do not take into account the security implications of the scheduled container on the attack surface of the host. In this regard, scheduling has been used to separate tenants on physically separate hosts and scheduling applications on different cores to thwart certain kinds of side-channel attacks. Academic research in the area of security-aware schedulers has so far focused on VM scheduling and use of Common Vulnerability Scoring System (CVSS) as the single risk metric to globally reduce.

There remains a need in the art to ensure security of container-based clouds.

BRIEF SUMMARY

A method, apparatus and computer program product for scheduling placement of containers in association with a set of hosts. The technique utilizes a set of one or more metrics that characterize container-specific risks. A first metric is a host interface risk for a container that quantifies how similar or dissimilar the container is relative to other containers running on a host. Preferably, host interface risk is derived with respect to a system call interface comprising a set of system calls, and the metric is based at least in part on a measure of dissimilarity among system calls and the potential exploitability and harm of those dissimilar system calls on the host and co-located containers. A second metric is a data sensitivity score that quantifies a degree to which sensitive data accesses are associated to the container. Based at least in part on the host interface risk scores and the data sensitivity scores, one or more containers are automatically scheduled for placement on the set of hosts to minimize security risk for the set of hosts. The approach herein provides for a specialization-aware container scheduler that places containers based on their system call usage profile in such a way that can minimize the total number of needed system calls across all hosts. In particular, the dissimilarity (first) metric maximizes the overall system call interface reduction, but it also better spreads the placement of containers across the compute cluster. Furthermore, the scheduling scheme herein is extensible and accounts for one or more user-defined security preferences, such as the acceptable system calls on the hosts.

According to a further aspect of this disclosure, cloud container security is improved significantly by transparently isolating containers that can potentially compromise host and other containers, e.g., those with access to sensitive/privileged data.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 8 depicts a particular embodiment of a specialization-aware container placement algorithm for container placement decisions according to this disclosure.

DETAILED DESCRIPTION OF AN ILLUSTRATIVE EMBODIMENT

Figure 1:
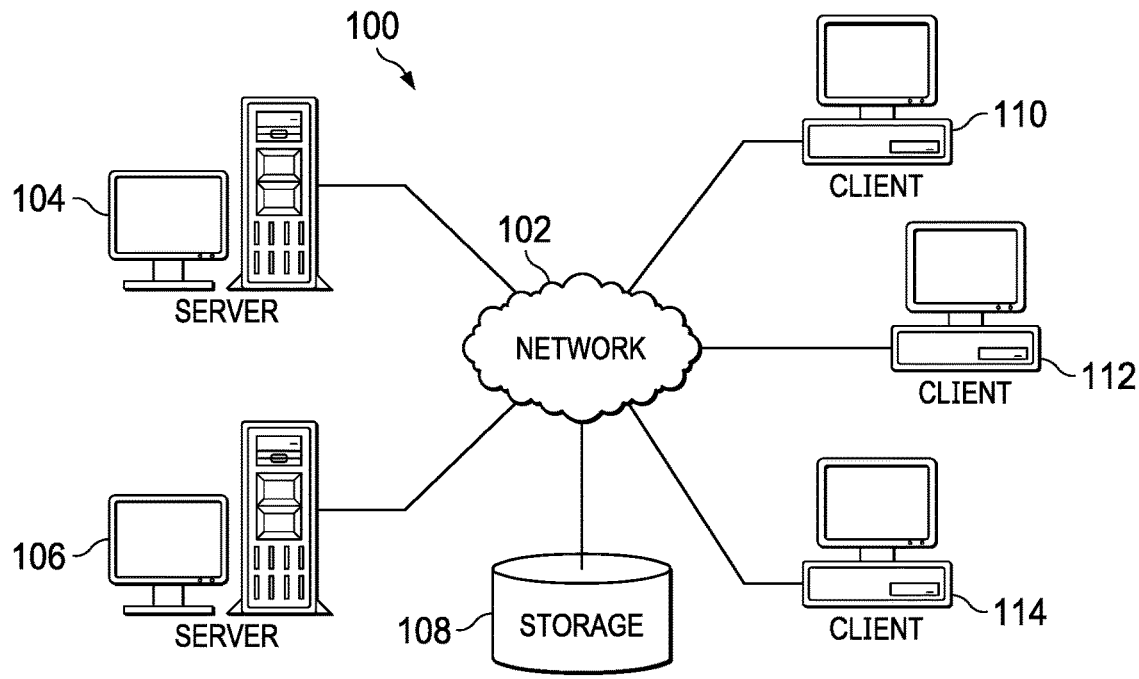
FIG. 1 depicts an exemplary block diagram of a distributed data processing environment in which exemplary aspects of the illustrative embodiments may be implemented.
Figure 2:
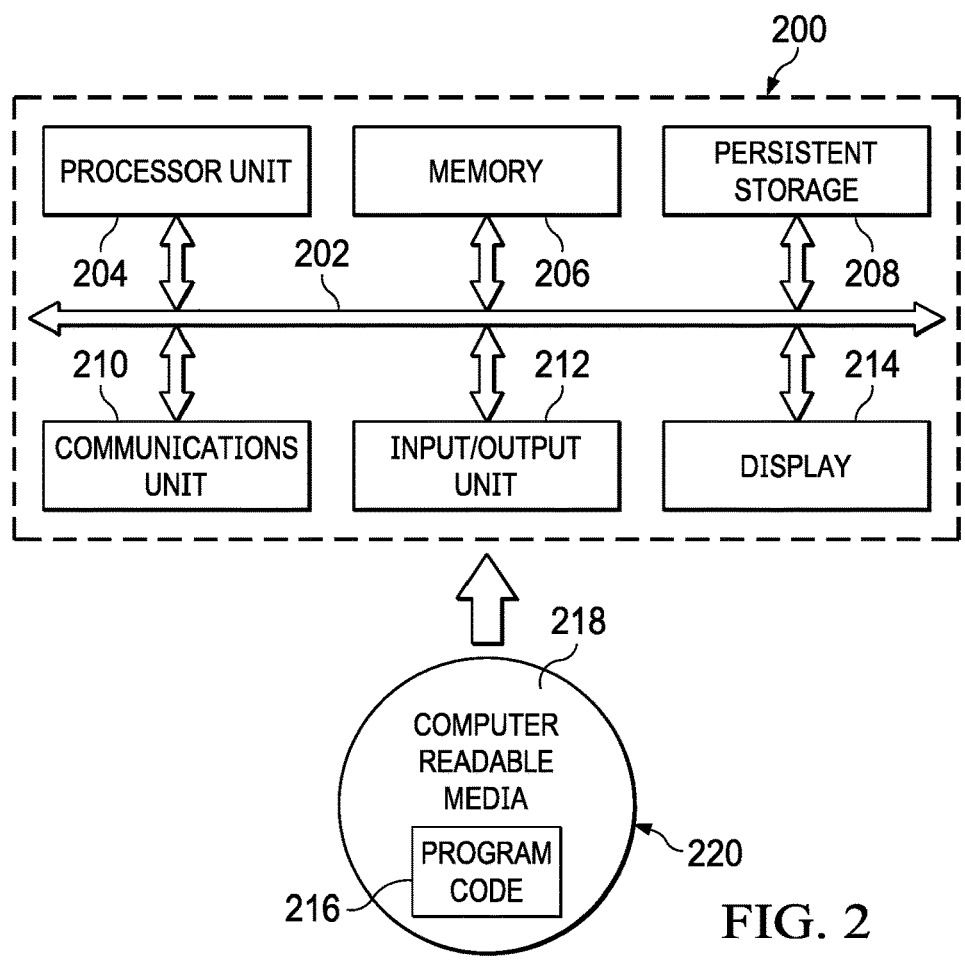
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
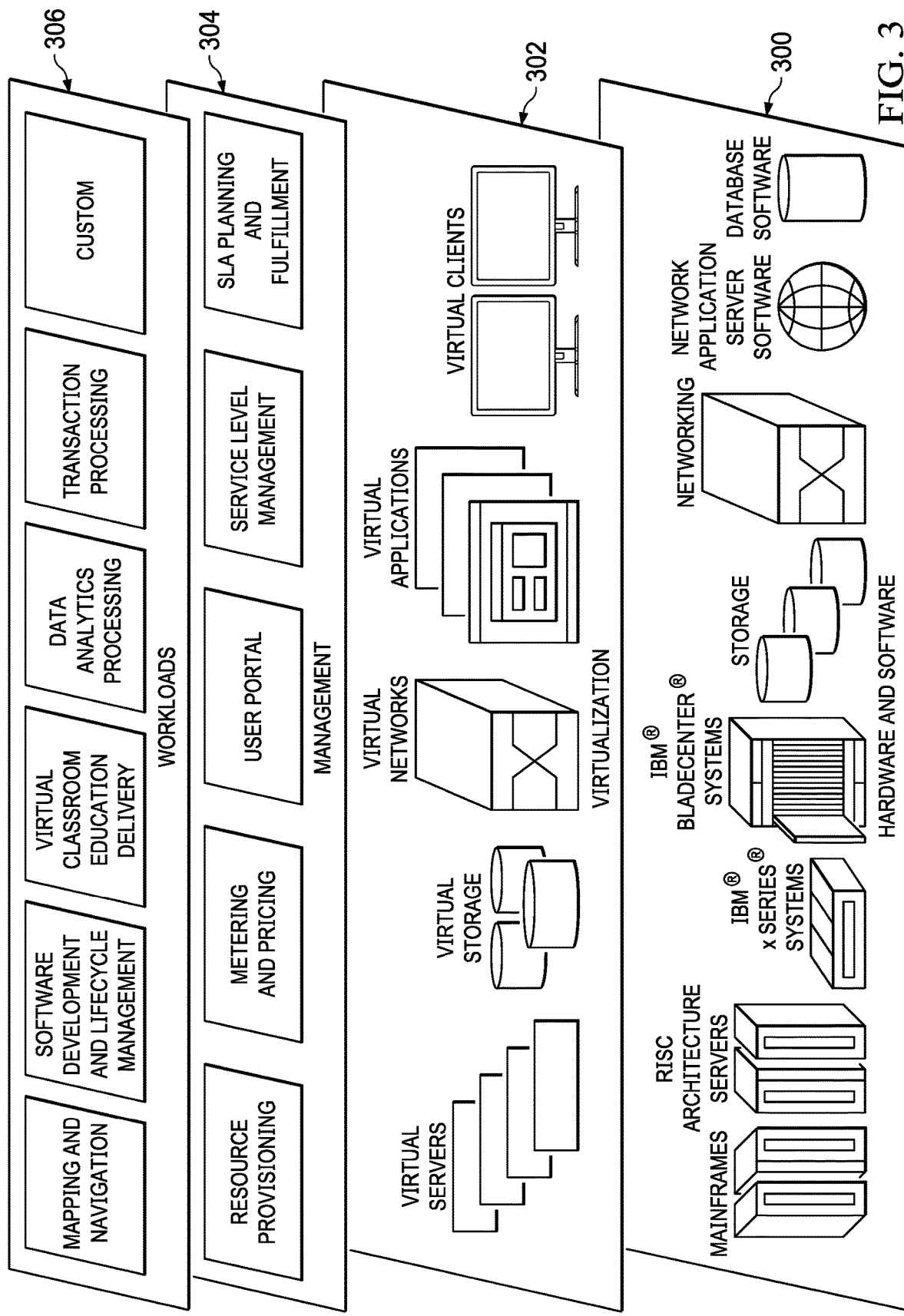
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions that may be provided from this layer include mapping and navigation, software development and lifecycle management, virtual classroom education delivery, data analytics processing, transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, New York In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Most cloud-based services available today are delivered through either bare metal or virtual machines (VMs), however, "container" technologies may also be used. Bare metal environments are those wherein applications are installed, run, and delivered from a base of dedicated cloud infrastructures and OS platforms. Such environments use dedicated and specific hardware and operating system configurations. A virtual machine, in contrast, is machine is a complete guest host running inside of a host system. When virtual machines are used, applications are installed, packaged, and run under the control of a hypervisor, which virtualizes the hardware environment. Containers, on the other hand, provide an operating environment wherein only the essential parts of the application (sometimes referred to as cloud services) and its dependencies are included, and there can be multiple containers running within a single instance of an operating system, such as Linux. Docker is a virtualization platform that shares a single Linux kernel with all running instances (called containers). A single Docker container is lightweight, as it is running on a shared kernel, making efficient use of available resources. Containers are used extensively by many next-generation cloud Platform as a Service (PaaS) developers. Thus, for example, and without limitation, IBM® Bluemix™ is a PaaS cloud platform that uses IBM Containers to run Docker containers. Because a Docker container runs on the existing operating system and shared binaries, it is more compact than a VM; thus, a container solution is often faster and have less memory requirements.

Figure 4:
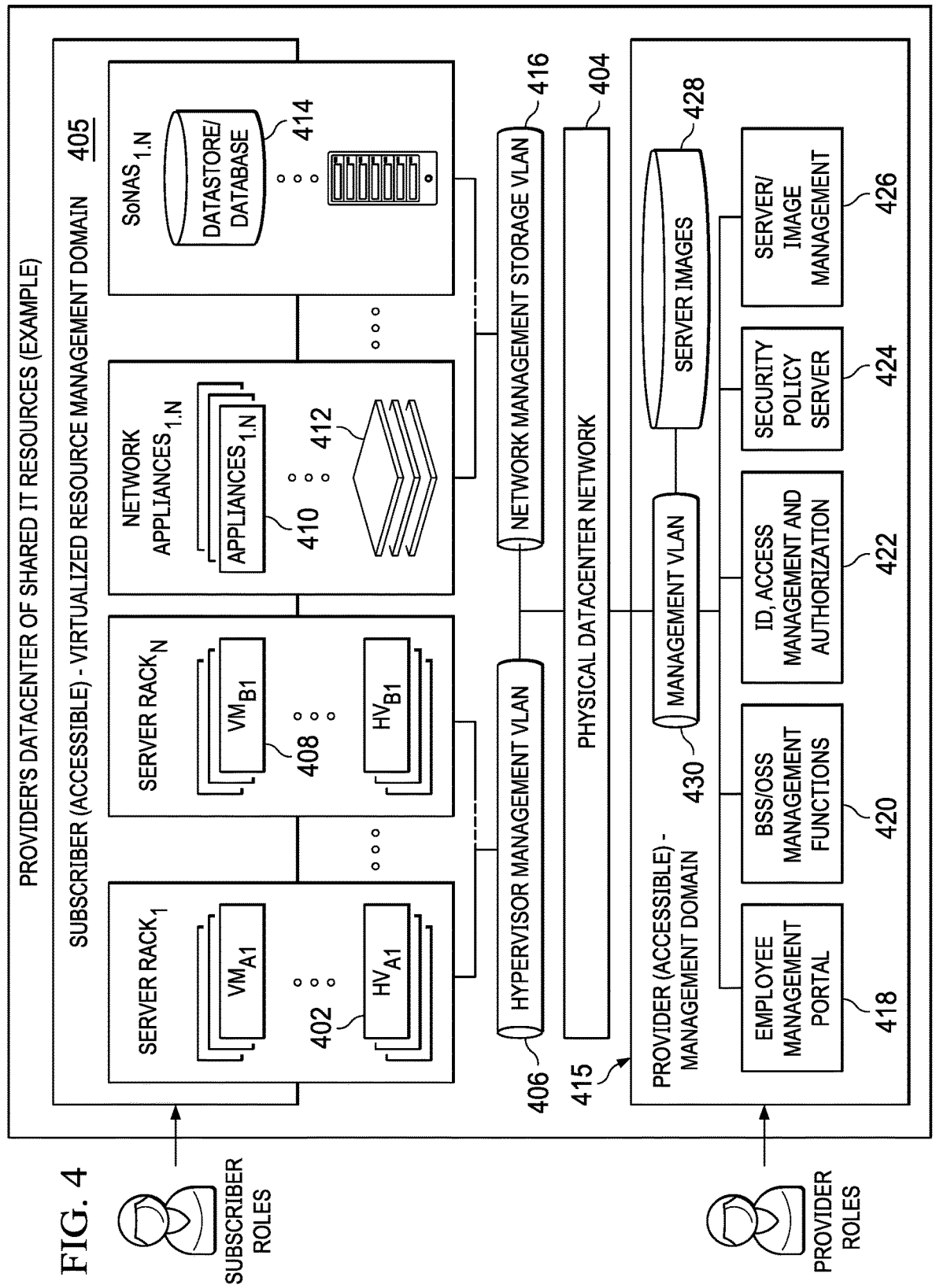
FIG. 4 illustrates an exemplary operating environment in which a network-based appliance may be used to facilitate deployment of one or more cloud-based offerings.

FIG. 4 illustrates a typical IT infrastructure that supports VM-based virtualization of resources and in which the below-described techniques of this disclosure may be implemented in one embodiment. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine or container-based hosting environment that comprises host machines (e.g., servers or like physical machine computing devices) connected via a network and one or more management servers. Typically, the physical servers are each adapted to dynamically provide one or more virtual machines or containers using virtualization technology, such as VMware ESX/ESXi or Docker.

In a non-limiting implementation, representative platform technologies are, without limitation, IBM System x® servers with VMware vSphere 4.1 Update 1 and 5.0.

It is also known in the art to configure or provision cloud architectures such as described above to include mechanisms and systems that operate generally to gather (or otherwise obtain from other data sources) information about available cloud platforms, topologies and capabilities. Typically, cloud security may be implemented and enforced with various techniques that include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others.

Cloud application packages may be deployed using platform-as-a-service (PaaS) infrastructure, such as the IBM® Cloud open cloud management platform (also known as SmartCloud® Orchestrator), or IBM® Bluemix.™ The cloud computing environment may also include various deployment and management tools. For example, IBM Cloud includes IBM® Cloud Manager with OpenStack. Cloud Manager is a self-service portal for simplified cloud management for the cloud end user. Cloud Manager with OpenStack enables the user to work with virtual appliances and workloads focusing on the end user's perspective, rather than the IT or systems administrator's perspective. Self-service capabilities simplify the process of executing many common public or private cloud operations such as provisioning and de-provisioning servers (a process known as deploying), drafting and cloning deployments, taking deployment snapshots, starting up and shutting down servers, and resizing existing servers.

Security Risk-Based Container Scheduling

With the above as background, the techniques of this disclosure are now described.

Figure 5:
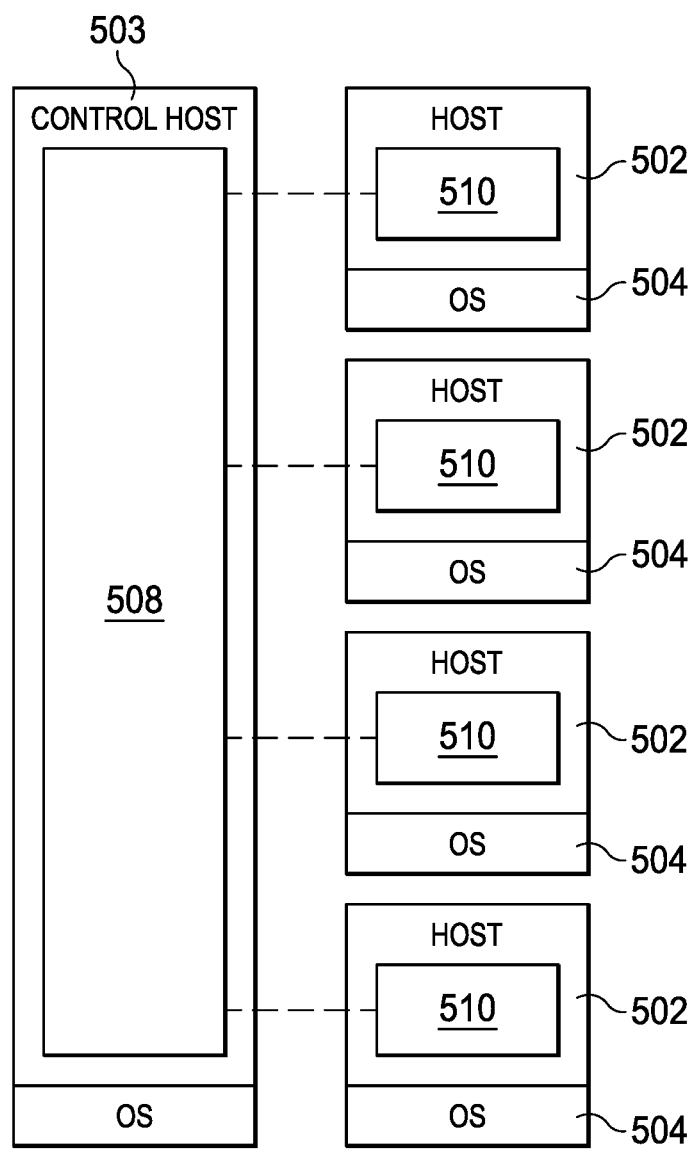
FIG. 5 depicts a container-based operating environment in which the techniques of this disclosure are implemented.

A representative container-based cloud system architecture in which the technique of this disclosure is practiced is depicted in FIG. 5. As shown, a computing cluster 500 comprises a set of hosts 502, with each host machine having an operating system 504 that supports containers. One of the hosts preferably serves as a control host 506. Each host also supports agent functionality that facilitates the techniques of this disclosure. An agent 508 running on the control host 503 acts as a controller agent, obtaining container and system call metrics from the other hosts 502, and using that information to make container scheduling decisions in a manner to be described in more detail below. Agent 510 running on a host 502 collects various information, such as system call metrics, network connection information, and the like, and reports such data to the controller agent 508 running on the control host. Each agent may be implemented as software, namely, as a set of computer program instructions executed by one or more hardware processors. A typical host is configured as described above in connection with FIG. 1, and typically hosts are cloud-based as described above in connection with FIGS. 3 and 4.

According to one embodiment, the agent 510 running on a host 502 collects one or more host-side risk metrics, as well as one or more user-specified collection constraints. The host-side risk metrics typically comprise information about host interface risk, typically arising from the system call interface. As will be described, there may be various factors that contribute to host interface risk, although in an embodiment these factors include dissimilar system calls, system call popularity, data about system call vulnerabilities (e.g., CVSS scores), as well as numeric data reflecting a relative level of control that a system call has on a host. Formally, and in a representative implementation, these factors are conveniently defined as follows (for each host): dissimilar syscalls, a number of dissimilar system calls compared to the other containers running on the host; popularity, a hash table containing syscall popularity weights; CVSS, a hash table containing syscall CVSS scores; and level of control, a hash table containing a numeric value of each system call indicating its level of control on the host. Based on the factors, a risk score is then computed as follows: Risk score=(dissimilar syscalls*(1−popularity))+(dissimilar syscalls*CVSS)+(dissimilar syscalls*level of control). Other dissimilar syscall-based risk score computations, e.g. based on one or more of the additional factors of popularity or CVSS or level of control, may also be used.

The above-described risk metrics are sometimes referred to herein as workload-centric in that they indicate the amount of access to host system interfaces (e.g., system calls) that the container workload will use. Workload-centric information may be pre-generated through analysis (e.g., static analysis) and/or explicitly specified in a configuration file (e.g., a seccomp profile). In addition to the host (workload-centric) risk score described above, preferably the container scheduling approach of this disclosure leverages another category of metrics, namely, one or more additional constraints that are sometimes referred to herein as user-centric or user-specified. In general, this type of metric captures the rules or criteria set by cloud users to indicate a container's restrictions on co-locations or sharing policies. A preferred embodiment of the user-centric metric leverage sensitive data access identification or, more generally, data access sensitivity tracking. Data sensitivity tracking typically comprises information about which processes in a container access a sensitive database or the like. Users may tag a database as being sensitive, or connection tracking may be used to determine which processes (and thus which containers) have access to such sensitive data.

According to a further feature of this disclosure, the tracking of the sensitive data access enables generation of a data sensitivity score. The data sensitivity score may be binary and thus indicates whether or not a container has any sensitive connections. While a binary data sensitivity score is useful, a preferred approach is to use a numeric data sensitivity score, e.g., a score that is computed as a summation of a number of sensitive outgoing connections+an average sensitive data volume per connection. Other similar computations may be used. In addition to a local agent such as described above, a network proxy or other containers may be used to perform the tracking of the sensitive data.

According to this disclosure, the above-described risk scoring is used to determine a risk score for each container. When it comes time to determine where to position a new container in the cluster of hosts, a scheduling algorithm is then executed.

Figure 6:
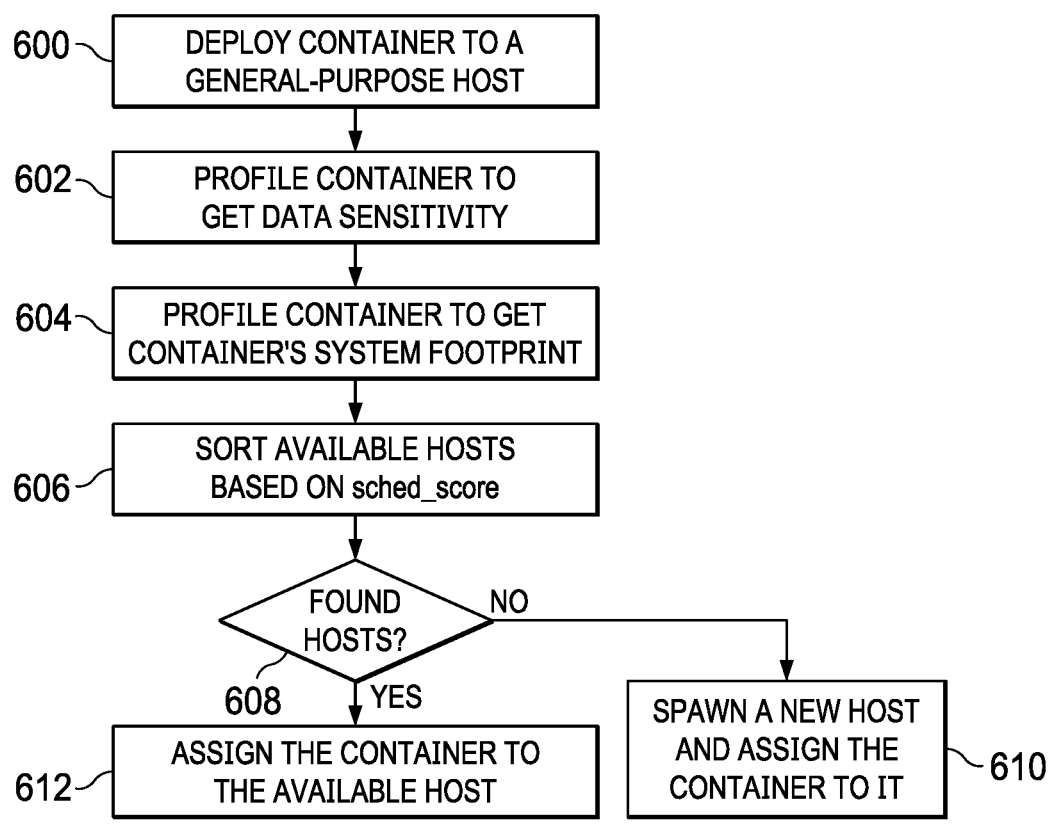
FIG. 6 depicts a process flow of an algorithm for initial placement/deployment of a container on a host.

FIG. 6 is a process flow indicating an initial placement of a container. The routine begins at step 600 when a container is to be deployed to a general purpose host. At step 602, the container is profiled, e.g., to obtain its data sensitivity. At step 604, the container is further profiled, e.g., to obtain the container's system footprint. Steps 602 and 604 may be combined. At step 606, the available hosts for the supporting the container are sorted based on a scheduling score, e.g., sched score defined as |risk score−data sensitivity|, where risk score is defined as popul score+cvss score+loc score and data sensitivity is a minimum data sensitivity value of the containers. A test is then performed at step 608 to determine if there are any hosts available to host the container. If not, control branches to step 610 to spawn a new host, and to assign the container to the new host. If, however, the outcome at step 608 is positive because there hosts available to host the container, the routine continues at step 612 to assign the container to the available host. Although not shown in the process flow, resource availability checking is assumed to occur while looking for a host for the container.

Thus, and according to FIG. 6, automatic scheduling of an incoming container typically involves profiling the incoming container to obtain its data sensitivity score, and optionally its anticipated system footprint. The hosts that are available to support the incoming container are then sorted, preferably based on the host interface risk scores and the data sensitivity scores, including the sensitivity score obtained for the incoming container. The incoming container is assigned to an available host, or to a new host that may be spawned as necessary.

Figure 7:
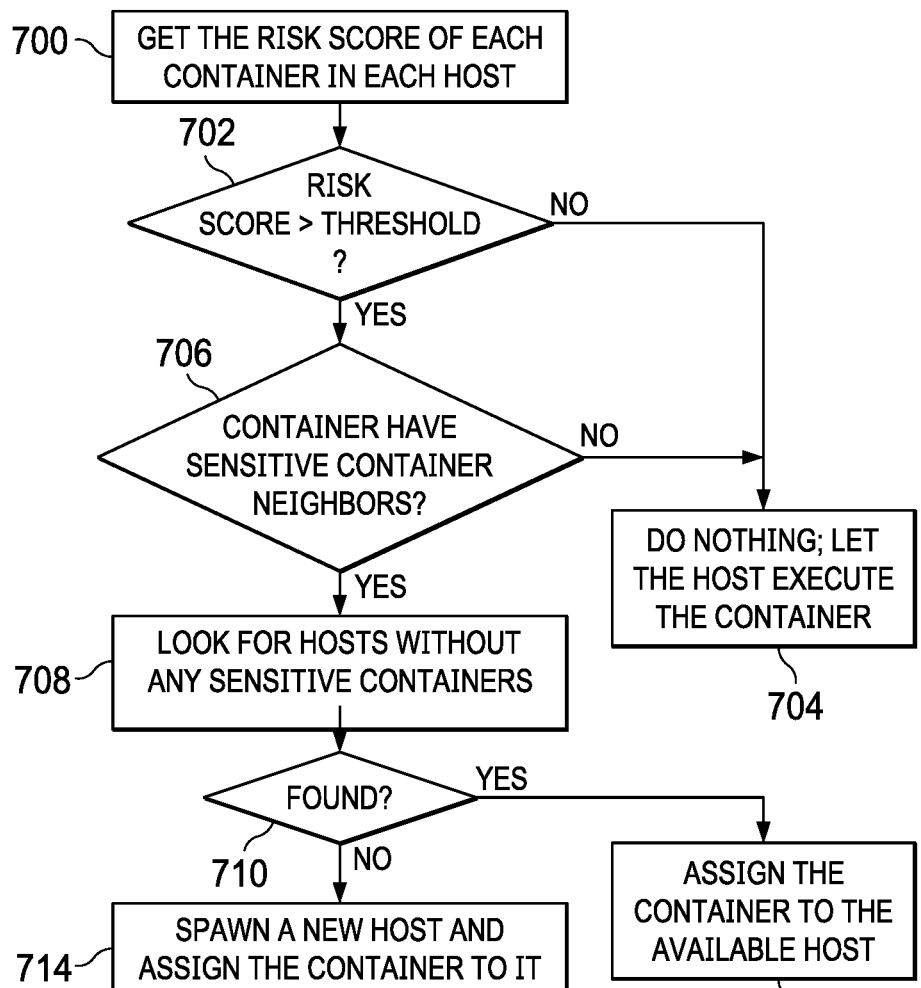
FIG. 7 depicts a process flow of a runtime container algorithm according to an embodiment herein.

FIG. 7 is a process flow depicting an enforcement scheme according to this disclosure when the system is operational and some containers have been scheduled and running and/or completed and terminated. This is a preferred operation that isolates risky containers during normal system operation. The routine is carried out during runtime and it begins at step 700 by obtaining the risk score of each container in each host. At step 702, and for each container, a test is performed to determine if a risk score exceeds a threshold. If not, the routine branches to step 704, and no isolation is performed (i.e., the host continues to execute the container). If, however, the outcome of the test at step 702 indicates that the risk score for the container exceeds the threshold, control continues at step 706. At step 706, a test is performed to determine whether the container has one or more sensitive container neighbors (also running on the host). A sensitive container neighbor means that the container is running one or more processes that interact with sensitive data sources (and thus have some associated sensitivity data access scoring that is non-zero). If the outcome of the test at step 706 is negative, control again branches back to step 704, and nothing is changed. If, however, the outcome of the test at step 706 indicates that the container (whose risk score exceeded the threshold at step 702) has one or more sensitive neighbor containers, control then continues at step 708. Step 708 examines the system for other hosts without any sensitive containers (meaning containers that are running processes that do not access sensitive data). A test is performed at step 710 to determine whether any such hosts (without sensitive containers) exist in the cluster (or otherwise). If the outcome of the test at step 710 indicates that no other host is running containers that are not sensitive, control continues at step 712 to spawn a new host, and to assign the container to the new host. If, however, the outcome of the test at step 710 is possible, the routine branches to step 714 to assign the container (whose risk score exceeded the threshold) to an available host, namely, one that is not executing a sensitive container. This completes the processing. As in the initial placement process flow (FIG. 6), resource availability checking is also implicit while looking for a host for a container that needs to be re-positioned.

Thus, and according to FIG. 7, automatic scheduling herein can be used to enforce transparent container isolation as necessary. According to this feature, the control host obtains the host interface risk score for each container in each host. Then, and for a given container, the control host determines whether the host interface risk score exceeds a threshold. When the host interface risk score exceeds the threshold, a determination is then made whether the given container has any neighbor containers whose data sensitivity scores satisfy a criteria for sensitive data access. When the given container has any neighbor containers whose data sensitivity scores satisfy the criteria, the given container is assigned to another host in the set of hosts. In particular, preferably the host assigned to the given container is one that does not include any container whose data sensitivity score satisfies the criteria for sensitive data access.

FIG. 8 depicts a preferred placement decision algorithm in additional detail. The inputs to the algorithm are at lines 1-5 and comprise a containerized application, lists of hosts/nodes, and workload-centric information such as POPUL, a weight vector for syscall popularity, CVSS, a weight vector for syscall CVSS, and LOC, a weight vector for syscall level of control on a host. It is not required that all of these inputs be used. The output at line 6 represents the best host for the incoming container. Line 7 obtains the user-centric metric, data sensitivity vector. As described above in FIGS. 6-7, the algorithm first finds the feasible hosts, e.g., by filtering the hosts having less resources than required by the incoming, and by filtering hosts by enforcing user-provided constraints. After filtering the hosts based on resource requirements and constraints, the remaining hosts are capable of executing the incoming container. These remaining hosts are the candidates referenced at line 8. The algorithm then computes the dissimilarity score at lines 9-15. When numerical data sensitivity scoring is available, the algorithm chooses a host where the incoming container has a maximum score computed based on |normalized risk score−normalized data sensitivity|. This computation is depicted at lines 16-17. At lines 19-20, the algorithm picks the best candidate from a list of candidates based on the score at lines 19-20. At line 21, and if binary data sensitivity scoring is used, the algorithm applies a strict enforcement using that constraint. Strict enforcement provides for a placement restriction wherein a container with a risk score above a threshold will not be placed on a host having containers with sensitive data. This operation was depicted in FIG. 7. Strict enforcement as provided at line 21 is optional. The algorithm returns a mapping between the incoming container and the best host. If no host is available, the algorithm returns an empty mapping.

As noted above, the scoring used herein to facilitate container scheduling is based on the system calls used by a container. In a preferred approach, the score is a single value that quantifies how dissimilar a container is with respect to all containers running on a host (node). Specifically, a preferred approach compares the system calls used by a container with the total system calls used by all containers running on a specific host. Thus, the dissimilarity score is sometimes referred to herein as a host-level dissimilarity score. As has been described, the dissimilarity score captures the system call similarity while serving as a natural load-balancer because no hosts starve and remain underutilized.

Formally, host-level dissimilarity is defined as follows. Suppose the union set of system calls used by running containers on a host is N and the set of system calls used by an incoming container is M. Then, host-level dissimilarity, dissim, is expressed using the following equation, where |X| indicates the cardinality of the set X.

$$dissim = abs(|N| - |N \cap M|)$$

The dissim score captures how much a host is different from the incoming container.

Figure 9:
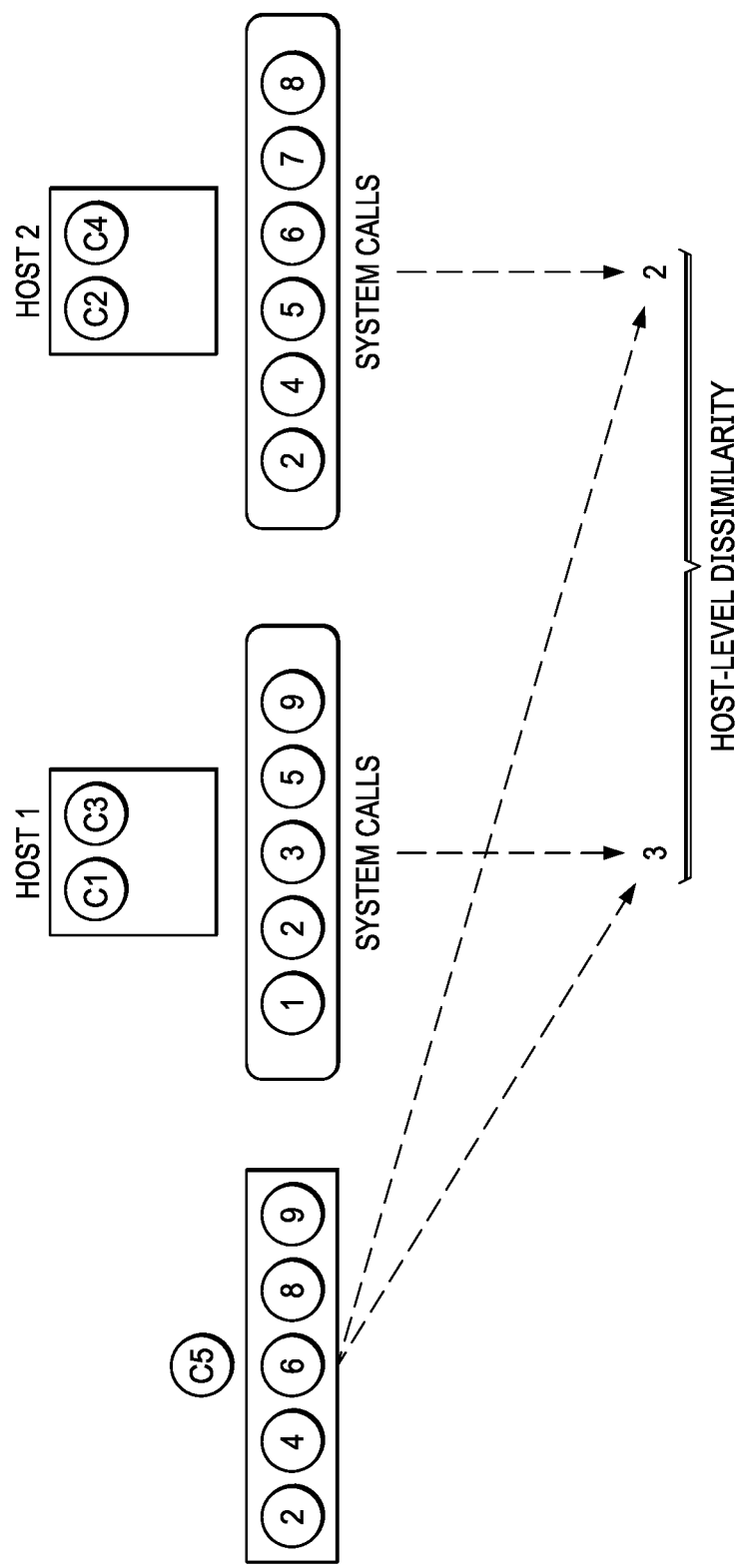
FIG. 9 depicts an example scenario showing how dissimilarity scores are computed for a pair of hosts for an incoming container.

To provide a concrete example, FIG. 9 shows the dissimilarity scores for Host1 and Host2 for an incoming container C5. The common system calls between container C5 and Host1 is {2, 9}, and between container C5 and Host2 is {2, 4, 6, 8}. Based on the above equation, the dissimilarity scores for Host1 and Host2 are 3 and 2, respectively. Although simple to compute, the dissimilarity score is powerful enough to minimize the total number of system calls needed on a host and spread the containers across all hosts to avoid hotspots.

The technique of this disclosure provides significant advantages. The technique enables container scheduling to be based on consideration on container-specific risks. These risk are automatically measured, and placements are performed to minimize overall risk to the cluster. As noted above, one way that this technique reduces overall cluster risk is by enabling system calls to be minimized. More generally, the scheduling scheme improves the efficacy of existing scheduling mechanisms and provides a new security model for container-based clouds in which each host can have a different number of system calls available and can guarantee that all running containers adhere to the restricted interface. The scheduling technique as described herein reduces cluster-wide host attack surfaces significantly, especially as compared to resource-based bin packing scheduling. An advantage of this scheme is that it reduces the cluster-wide attack surface holds even when increasing the number of application interfaces on a fixed size cluster. Further, the specialization-aware scheduling approach enables new security incentives for users, wherein users gain security by explicitly listing the system calls they use or reworking their applications to rely on fewer system calls.

Without intending to be limiting, the scheduler as described herein may be deployed in container orchestration engines (COEs), such as Kubernetes and OpenShift, that are configured to obtain the system call usage profile of each incoming container (from a container manifest or otherwise), or to otherwise receive user-centric data sensitivity (or other such) information.

Typically, the approach herein is implemented on a container-based cloud, but this is not a limitation either. While some models of multi-tenant container clouds (e.g., function-as-a-service) deploy individual containers, other models (e.g., multi-tenant Kubernetes clusters) deploy containers at the granularity of a pod. A pod is a collection of related containers that must be co-located on the same kernel typically because they share one or more namespaces. Thus, even if the dissimilarity between containers in a pod is high, they must be scheduled together. Nevertheless, the system call dissimilarity approach herein may be used to enforce scheduling policies in this type of operating environment.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various data center architectures including simple n-tier architectures, web portals, federated systems, and the like. The herein also may be practiced in a loosely-coupled server (including a "cloud"-based) environment, whether, private, public, or hybrid.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the security manager is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

The techniques herein may be extended to other scheduling units besides containers, e.g., shared system libraries.

While a focus of the scheduling algorithm is on a host's attack surface that is exposed through system calls, attacks that come from other sources, such as devices on an associated network, may be used to develop useful metrics for driving the scoring and the scheduling. For example, current or future cloud workloads may require different network protocols; in such case, and if scheduled appropriately according to network protocol dissimilarity, hosts could omit support for parts of the networking stack, thereby reducing complexity and potentially avoiding vulnerabilities.

The system call metric itself may have variants, such as using frequency of system call invocations, or argument values to define more robust/complex metrics. Other variant workload-centric metrics may include dissimilarity of kernel code paths. Complex or precise metrics can aid the scheduling methodology by flagging containers that ask for more privileged than necessary and containers with malicious needs.

Having described the subject matter, what we claim is as follows.

The invention claimed is:

1. A method for scheduling placement of containers in association with a set of hosts, comprising:
    computing a host interface risk score for a container that quantifies a potential exploitation of the host interface, wherein the host interface is a system call interface comprising a set of system calls, and wherein the host interface risk score is based on system call usage of the container relative to system call usage of other containers running on a host;
    associating a data sensitivity score to the container that quantifies a degree to which sensitive data accesses are associated to the container; and
    based at least in part on the host interface risk scores and the data sensitivity scores, automatically scheduling one or more containers for placement on the set of hosts to minimize security risk among a set of containers for the set of hosts.

2. The method as described in claim 1 wherein automatic scheduling comprises:
    for an incoming container:
        profiling the incoming container to obtain its data sensitivity score;
        sorting available hosts based on the host interface risk scores and the data sensitivity score obtained for the incoming container; and
        assigning the incoming container to an available host.

3. The method as described in claim 1 wherein automatic scheduling comprises:
    obtaining the host interface risk score for each container in each host;
    for a given container:
        determining whether the host interface risk score exceeds a threshold;
        when the host interface risk score exceeds the threshold, determining whether the given container has any neighbor containers whose data sensitivity scores satisfy a criteria for sensitive data access; and
        when the given container has any neighbor containers whose data sensitivity scores satisfy the criteria, assigning the given container to another host in the set of hosts.

4. The method as described in claim 3 wherein the host assigned to the given container is one that does not include any container whose data sensitivity score satisfies the criteria for sensitive data access.

5. The method as described in claim 1 wherein the host interface risk score is also based on one of: a system call popularity measure, a system call vulnerability measure, and a measure of a level of control on a host associated with a given system call.

6. The method as described in claim 1 wherein the data sensitivity measure is one of: an indication that the container has one or more outgoing connections to resources that host sensitive data, and a score derived by summing a number of the outgoing connections plus an average volume of sensitive data per outgoing connection.

7. An apparatus to schedule placement of containers in association with a set of hosts, comprising:
    one or more hardware processors;
    computer memory holding computer program instructions executed by the hardware processors and configured to:
        compute a host interface risk score for a container that quantifies a potential exploitation of the host interface, wherein the host interface is a system call interface comprising a set of system calls, and wherein the host interface risk score is based on system call usage of the container is-relative to system call usage of other containers running on a host;
        associate a data sensitivity score to the container that quantifies a degree to which sensitive data accesses are associated to the container; and
        based at least in part on the host interface risk scores and the data sensitivity scores, automatically schedule one or more containers for placement on the set of hosts to minimize security risk among a set of containers for the set of hosts.

8. The apparatus as described in claim 7 wherein the computer program instructions configured to automatically schedule one or more containers for placement comprise computer program instructions further configured to:
    for an incoming container:
        profile the incoming container to obtain its data sensitivity score;
        sort available hosts based on the host interface risk scores and the data sensitivity score obtained for the incoming container; and
        assign the incoming container to an available host.

9. The apparatus as described in claim 7 wherein the computer program instructions configured to automatically schedule one or more containers for placement comprise computer program instructions further configured to:

obtain the host interface risk score for each container in each host;
for a given container:
determine whether the host interface risk score exceeds a threshold;
when the host interface risk score exceeds the threshold, determine whether the given container has any neighbor containers whose data sensitivity scores satisfy a criteria for sensitive data access; and
when the given container has any neighbor containers whose data sensitivity scores satisfy the criteria, assign the given container to another host in the set of hosts.

10. The apparatus as described in claim 9 wherein the host assigned to the given container is one that does not include any container whose data sensitivity score satisfies the criteria for sensitive data access.

11. The apparatus as described in claim 7 wherein the host interface risk score is also based on one of: a system call popularity measure, a system call vulnerability measure, and a measure of a level of control on a host associated with a given system call.

12. The apparatus as described in claim 7 wherein the data sensitivity measure is one of: an indication that the container has one or more outgoing connections to resources that host sensitive data, and a score derived by summing a number of the outgoing connections plus an average volume of sensitive data per outgoing connection.

13. A computer program product comprising a non-transitory computer readable medium for use in a data processing system to schedule placement of containers in association with a set of hosts, the computer program product holding computer program instructions executed in the data processing system and configured to:
compute a host interface risk score for a container that quantifies a potential exploitation of the host interface, wherein the host interface is a system call interface comprising a set of system calls, and wherein the host interface risk score is based on system call usage of the container relative to system call usage of other containers running on a host;
associate a data sensitivity score to the container that quantifies a degree to which sensitive data accesses are associated to the container; and
based at least in part on the host interface risk scores and the data sensitivity scores, automatically schedule one or more containers for placement on the set of hosts to minimize security risk among a set of containers for the set of hosts.

14. The computer program product as described in claim 13 wherein the computer program instructions configured to automatically schedule one or more containers for placement comprise computer program instructions further configured to:
for an incoming container:
profile the incoming container to obtain its data sensitivity score;
sort available hosts based on the host interface risk scores and the data sensitivity score obtained for the incoming container; and
assign the incoming container to an available host.

15. The computer program product as described in claim 13 wherein the computer program instructions configured to automatically schedule one or more containers for placement comprise computer program instructions further configured to:
obtain the host interface risk score for each container in each host;
for a given container:
determine whether the host interface risk score exceeds a threshold;
when the host interface risk score exceeds the threshold, determine whether the given container has any neighbor containers whose data sensitivity scores satisfy a criteria for sensitive data access; and
when the given container has any neighbor containers whose data sensitivity scores satisfy the criteria, assign the given container to another host in the set of hosts.

16. The computer program product as described in claim 15 wherein the host assigned to the given container is one that does not include any container whose data sensitivity score satisfies the criteria for sensitive data access.

17. The computer program product as described in claim 8 wherein the host interface risk score is also based on one of: a system call popularity measure, a system call vulnerability measure, and a measure of a level of control on a host associated with a given system call.

18. The computer program product as described in claim 13 wherein the data sensitivity measure is one of: an indication that the container has one or more outgoing connections to resources that host sensitive data, and a score derived by summing a number of the outgoing connections plus an average volume of sensitive data per outgoing connection.

* * * * *